Figure 4:
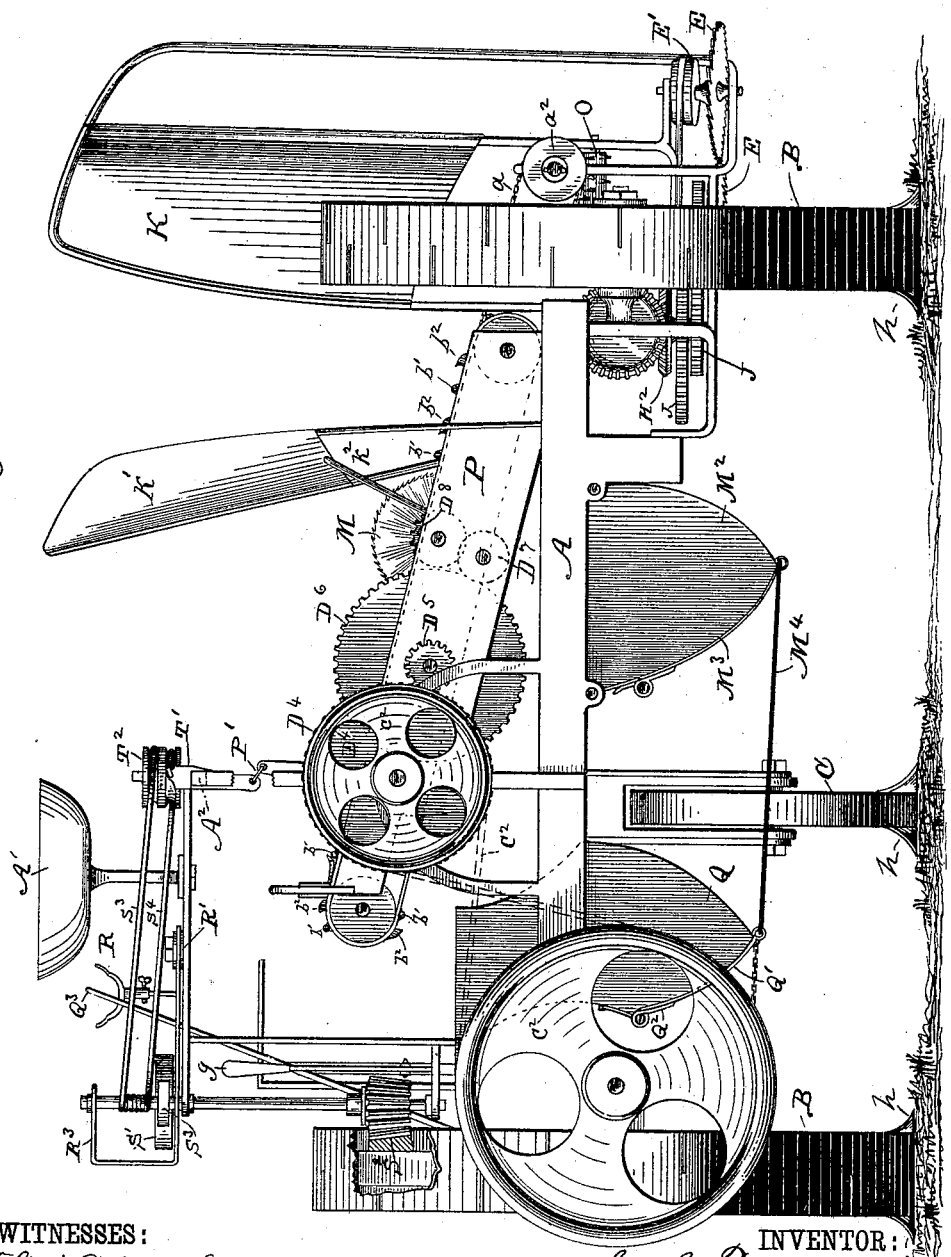

(No Model.) 4 Sheets—Sheet 1.
S. H. PEARCY.
HARVESTER FOR SUGAR CANE, CORN, &c.
No. 353,758. Patented Dec. 7, 1886.
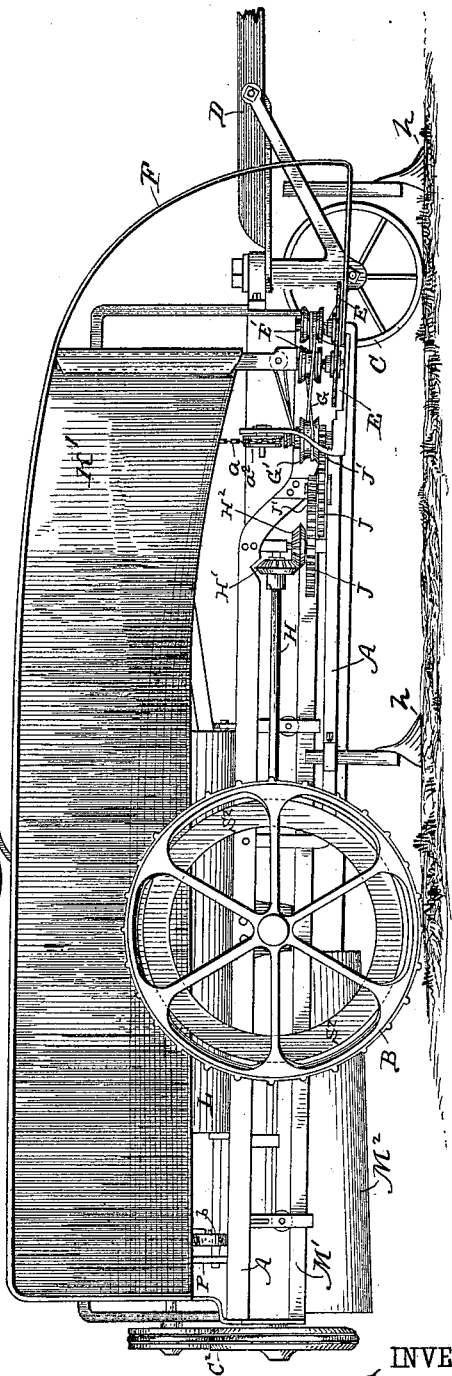
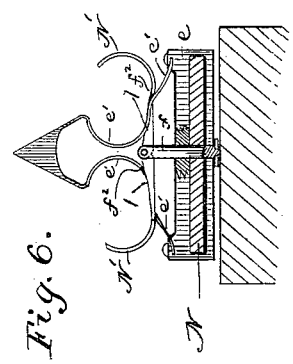
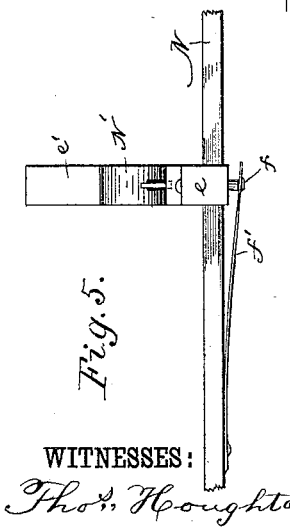
WITNESSES:
Thos. Houghton.
W. P. Stevens
INVENTOR:
S. H. Pearcy
BY Munn & Co
ATTORNEYS.

(No Model.) 4 Sheets—Sheet 2.
S. H. PEARCY.
HARVESTER FOR SUGAR CANE, CORN, &c.
No. 353,758. Patented Dec. 7, 1886.
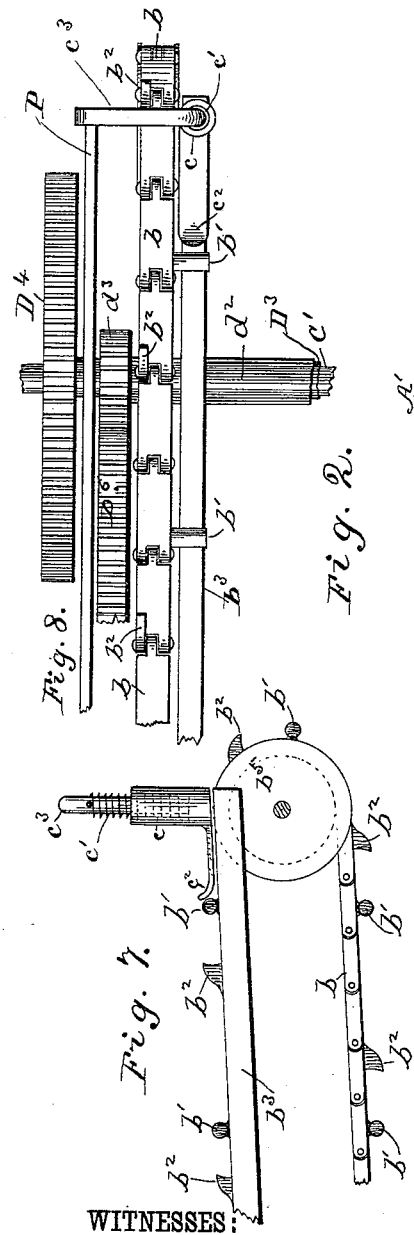
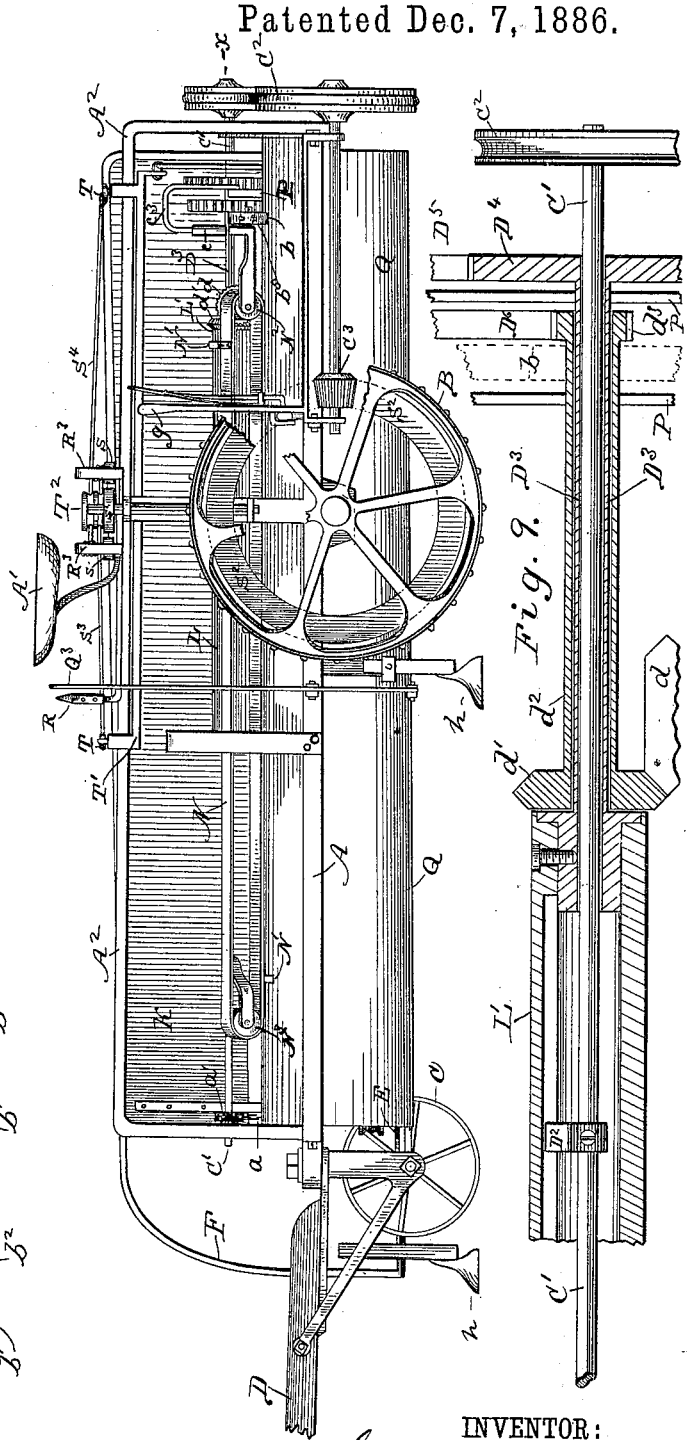
WITNESSES:
Thos. Houghton.
W. X. Stevens
INVENTOR:
S. H. Pearcy
BY Munn & Co.
ATTORNEYS.

(No Model.) 4 Sheets—Sheet 3.
S. H. PEARCY.
HARVESTER FOR SUGAR CANE, CORN, &c.
No. 353,758. Patented Dec. 7, 1886.
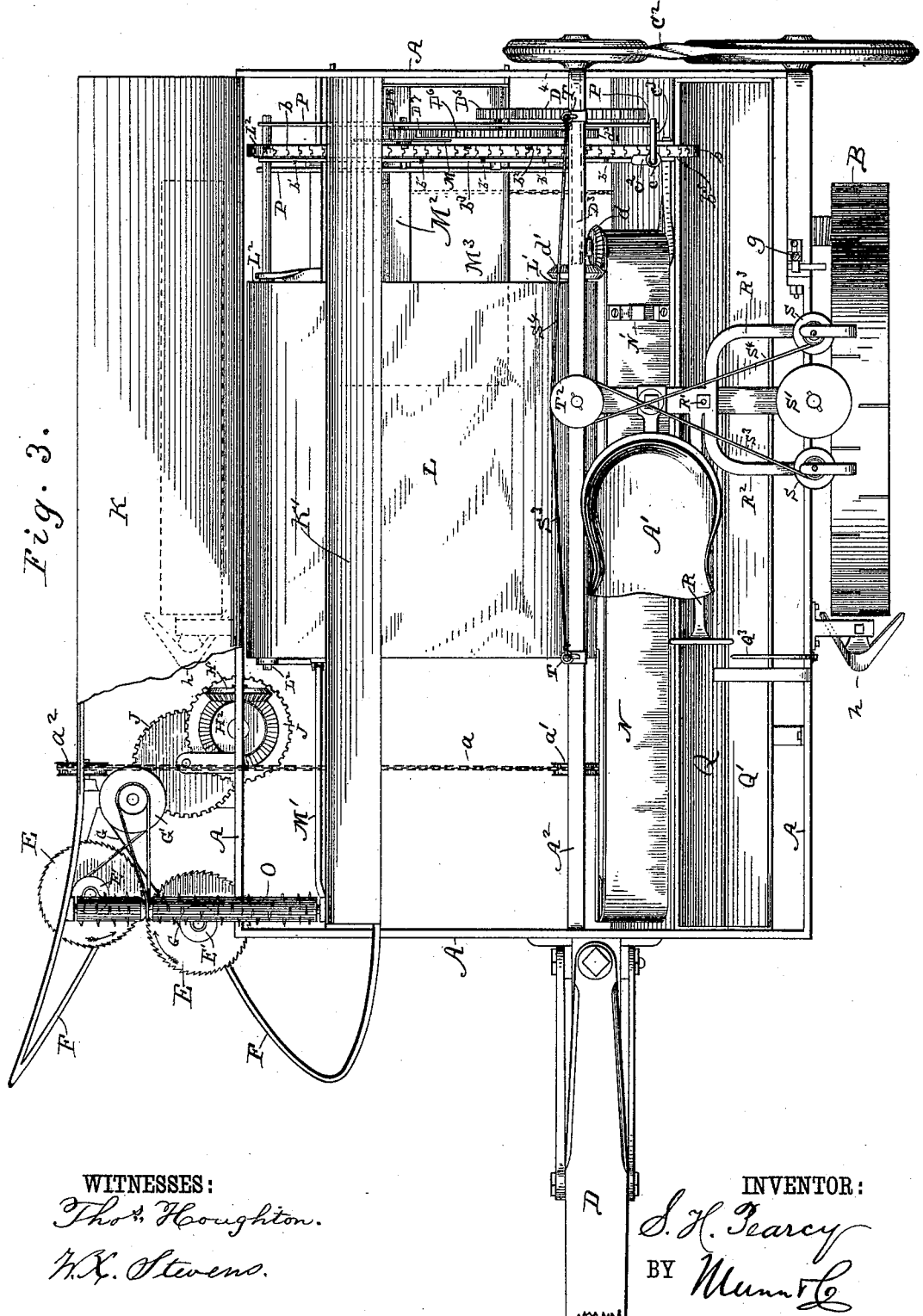
WITNESSES: INVENTOR:
Thos. Houghton. S. H. Pearcy
W. X. Stevens. BY 
ATTORNEYS.

(No Model.) 4 Sheets—Sheet 4.

S. H. PEARCY.
HARVESTER FOR SUGAR CANE, CORN, &c.

No. 353,758. Patented Dec. 7, 1886.

WITNESSES:
Thos. Houghton.
W. X. Stevens

INVENTOR:
S. H. Pearcy
BY Munn & Co
ATTORNEYS.

UNITED STATES PATENT OFFICE.

SAMUEL H. PEARCY, OF FRANKLIN, TENNESSEE, ASSIGNOR TO THE PEARCY CANE AND CORN HARVESTER COMPANY, OF TENNESSEE.

HARVESTER FOR SUGAR-CANE, CORN, &c.

SPECIFICATION forming part of Letters Patent No. 353,758, dated December 7, 1886.

Application filed June 18, 1885. Serial No. 169,125. (No model.)

*To all whom it may concern:*

Be it known that I, SAMUEL HARRIS PEARCY, a citizen of the United States, residing at Franklin, in the county of Williamson and State of Tennessee, have invented a new and useful Improvement in Harvesters for Sugar-Cane, Corn, &c., of which the following is a description.

This invention relates to machines which are mounted on wheels to be drawn by teams on fields of standing sugar-cane, corn, &c., to harvest the same; and its object is to provide means whereby a machine may automatically cut the standing canes and strip them of their tops and leaves and drop them in bunches while passing along the cane-rows.

To this end my invention consists in the construction and combination of parts forming a cane and corn harvester, hereinafter described and claimed, reference being had to the accompanying drawings, in which—

Figure 1 is a right side elevation of my invention. Fig. 2 is a left side elevation of the same. Fig. 3 is a plan view, and Fig. 4 is a rear end view thereof. Fig. 5 is a side elevation of the leaf-stripper and part of the belt which carries it. Fig. 6 is an end elevation of the leaf-stripper and a cross section of its belt. Fig. 7 is a side elevation of the stalk-holder and part of the chain-belt. Fig. 8 is a plan view of the chain-belt and stalk-holder. Fig. 9 is a longitudinal section of a portion of the drive shaft at $x$, Fig. 2.

A represents the body of the machine, consisting of a light frame mounted on two independently-journaled drive-wheels, B, and a forward wheel, C, which is hung as a caster, with a pole, D. The team in turning this pole from side to side guides the caster-wheel.

E represents two circular saws journaled in the main frame on vertical arbors, and provided with pulleys E'. It is intended that the team shall be driven so as to guide these saws upon the standing stalks, the line of the row to pass centrally between the saws. To this end the central line of the saws is just outside of the right drive-wheel.

F F are guides to bend any outstanding stalks into line to be cut. The saws are rapidly revolved in the direction to draw standing stalks in between them by means of a belt, G, crossed, as shown, and communicating with a pulley, G'. This pulley receives rotary motion from one of the drive-wheels B by means of a shaft, H, beveled gears H' H', and intermediate spur and pinion wheels, J J'. As the machine advances the stalks are cut off by the saws, and being tripped by the advancing motion of the machine, the stalks fall backward between the guides K K' upon a carrying belt or apron, L, which travels across the machine and drops the stalks upon the stripper-belt N, which carries knives N', and cuts or strips the leaves from the stalks, after which the stalks are dropped into a receptacle, Q. On their way across the machine the stalk-tops are cut off by a circular saw, M.

O is a roller driven by a belt from a pulley on the shaft with pulley G'. This roller is armed with spikes or sharp teeth to catch into the stalks near their butts, to carry them upward and sufficiently to the rear while they are falling so that they will pass the post $K^2$ in being carried across by the belt L. The guide K extends nearly down to the said belt, to prevent the stalks from falling out at the side of the machine, while the guide K' extends only part way down to the belt, leaving sufficient space for the stalks to be carried beneath it on the belt. The belt L is mounted on two rollers, L' L², which are journaled in a frame, P, that is mounted to reciprocate longitudinally on two tracks, M', of the main frame. This longitudinal reciprocation of the belt-frame is for the purpose of adjusting the location of the belt midway beneath falling stalks of any length. If the growth of cane is low, the belt-frame will be run forward, and if higher it will be run or set backward. This shifting of the frame is for another purpose also.

The frame carries the saw M, in order that the saw may be set so as to be sure and cut off the heads or seed-top from the cane and yet not cut off too much length of the stalk. The seeds are valuable, and I provide a receptacle, $M^2$, which is fixed to the main frame beneath the path of the saw M, to catch the offal therefrom. This receptacle is provided with a trapdoor, $M^3$, hinged at its upper edge to open the receptacle at the bottom thereof to drop the accumulated seeds in piles convenient to be gathered by attendants. The receptacle Q is also provided with a downwardly-opening trap-door, Q', which is closed by any suitable springs, Q², and is opened by the driver when he notices that enough stalks are gathered therein to form a convenient armful for an attendant to gather up.

Q³ is a lever connected with the trap-door Q' and extending up to within reach of the operator when riding in the seat A'.

M⁴ is a rod connecting the two trap-doors M³ and Q', so that a single movement of lever Q³ will drop both the stalks and the seeds. The frame P is reciprocated by the action of the left-hand drive-wheel, and is set into operation by a movement of the left leg of the driver, carrying to the right or left a lever, R, which is pivoted at R' on the main frame. This lever is forked to receive the driver's leg and is bent to one side at its rear end and bifurcated. Each leg R² and R³ thereof carries a small wheel and axle, S, either of which wheels may engage a drive-wheel, S', as the lever is set to the right or left, or both wheels may stand disengaged when the lever stands midway.

The wheel S' is mounted on a vertical shaft, which carries a beveled pinion that is in permanent engagement with a beveled gear, S², on the side of the left drive-wheel, so that the wheel S' is kept in constant rotation while the machine runs.

S³ and S⁴ are cords secured at one end to links T on a rod, T', and secured at their other ends, respectively, to the axles of the wheels S, running midway around a guide-pulley, T², which is journaled on a stud projecting from the rail A² of the main frame. The rod T' is fitted to slide on the rail A², and is connected with the frame P by a loose link, P', to avoid friction in case the rails or slideways of the two frames were out of parallel.

If the lever R be moved to the left, that one of the wheels S which winds up the cord S³ will be brought into frictional engagement with the drive-wheel S', and the rod T' and frame P will be drawn rearward. By the reverse movement of lever R the other wheel S will be engaged with the drive-wheel S', and the frame P will be drawn forward. By this means the driver may quickly set the frame much or little forward or backward to suit the height of the cane. As it requires a little force to slide the frame P, the wheels S will both remain disengaged unless forcibly engaged, so that the frame will remain as set unless it is intentionally moved. The apron L is rotated by the shaft C', which is journaled in the main frame and connected with the left drive-wheel B by means of pulleys and belt C² and the shaft and beveled pinion C³. The roller L' is hollow and loosely mounted on the shaft C', being connected to rotate therewith by means of a stud, D², fixed in the shaft to engage a slot in the roller, which permits the roller to slide lengthwise upon the shaft when the frame P, in which the roller is mounted, reciprocates.

D³ is a quill extending from one end of the roller L', to secure the spur-wheel D⁴ thereto. This wheel D⁴ is connected, by the train of speed-increasing gears D⁵, D⁶, D⁷, and D⁸, with the saw M to revolve it.

a is a chain mounted on a pulley, a', on the shaft C', and a pulley, a², on a stud fixed in the frame A. The office of this chain is to carry the butts of the stalks across evenly with the bodies when the belt L is set to the rear for tall canes.

b is a chain mounted on pulleys b⁴ and b⁵, the pulley b⁴ being on the shaft of the roller L² to drive the chain b, which is armed with laterally-projecting studs b' at every second or third link, and with radially-projecting teeth b² between the studs at the opposite edge of the chain thereto. It is the duty of the teeth b² to carry the head ends of the stalks to the saw and then across to a clamp, c. This clamp is a shoe fitted to slide vertically on a bow, c³, which is fixed to the frame P, and the said shoe is forced down by a spring, c', to stand on the rail b³ at one side of the chain b in the path of the studs b'. The toe c² of the shoe slants upward enough to form a wedge, beneath which the studs b' may successively enter, thereby raising the shoe and passing under it. At the same time a stalk carried by the next teeth b² to the rear of a stud which is holding up the shoe will be carried under the shoe, and when the stud passes from under the shoe the latter will be forced down by its spring and clamp the said stalk. Then the tooth which carried the stalk passing at some distance from the clamp—that is, near the other edge of the chain—will bend the head of the stalk and pass by, leaving the stalk held fast under the clamp until the next stud b' raises the shoe of the clamp and carries the stalk out of it, when the stalk drops into the bunching-receptacle. While the stalk is held in the clamp it is stripped of its leaves by the knives N' e', carried by the belt N, revolving from the head to the butt of the stalk. The belt N is mounted on rollers N² and N³, which are journaled on the frame P, slanting a little toward the bunching-receptacle Q, so that the stalks may fall from the belt into the receptacle when set free from the clamp c. The roller N² is provided with a beveled gear-wheel, d, which is engaged by a wheel, d', that is fixed to one end of a sleeve, d², which is mounted to revolve freely on the quill D³, and provided at its other end with a pinion, d³, which is engaged by the spur-wheel D⁶, whereby the blade-belt is revolved at a given speed relatively to the speed of the chain-belt b.

e is the cutter-head by which the knives N' are held to the belt N.

e' e' are blades secured at their lower ends to the cutter-head, curved toward each other midway to form two semicircles, and joined at the top in the form of a picket to part the canes when two chance to fall together. The forward edges of the semicircular portions are sharpened to serve as cutting-blades. The blades N' are curved opposite to the curves in the said blades e', forming therewith, when closed, complete circles, which may surround the stalks and trim the leaves from all sides thereof on being carried down the stalk. The blades N' are provided with shanks 1, which are pivoted at their ends to a puppet, f, which is forced to play endwise through the belt N by a shoe, f'. As the belt runs around the roller the shoe is pressed by the roller tightly up to the belt, carrying the puppet upward, and by its connection with the shanks causing the blades N' to open outward to receive stalks. This opening process will naturally be accomplished by the weight of the blades; but it may be insured by placing a shoulder, f², of the blades e' in the path of the shanks a little to one side of the puppet f, so that as the puppet rises the shoulders f² will serve as fulcra against or on which the shanks will turn as the blades open outward. As soon as the shoe passes the roller the puppet will be sprung downward, either by the action of the shoe, which may be a spring secured at its forward end to the belt, or by the action of a separate spring to force the puppet down the blades will be closed around the stalk to strip it as they advance.

The belt N may be of any suitable material, such as heavy leather, or leather bordered by two metallic chains, or a complete belt of metallic links. There are two sets of cutting-blades at equal distances apart on the belt, and the belts N and b are so timed relatively to each other that one of the cutters rises ready for work just as one of the studs b' passes out of the clamp, and the cutters travel the whole length of their cutting-path before another stud enters the clamp. By this means stalks of any length are sure to be stripped of their leaves before being dropped into the buncher, and before their heads are let loose from the clamp.

In harvesting corn the slide-frame P may be set so far back as to carry the cornstalks across to the buncher without the cut-off saw touching them, and the belt N may be removed. Suitable levers and clutch devices, such as shown at g, are provided, whereby the driver may disconnect the running parts from the drive-wheels while cutting large canes, which have very stiff stumps. If the ground over which the wheels are traveling is lumpy and uneven, it may happen that a large portion of the weight of the machine is suddenly thrown upon the saws while supported on the said studs, thus stopping the work of the saws at the risk of breaking them. To avoid this, I provide leveling-plows h, which are made vertically adjustable directly ahead of each wheel. These plows are mere scrapers, to level the earth temporarily relatively to the wheels of this machine for this one passage, and they have no effect in cultivating the earth nor in making a permanent road.

What I claim as my invention, and desire to secure by Letters Patent, is—

1. In combination with the cutting mechanism and a carrier adapted to receive the cut stalks, a top-cutter and a support for the latter, such support being movable in the direction of length of the machine, whereby to adjust the top-cutter to stalks of different lengths, substantially as set forth.

2. The combination of the supporting-frame, the cutting mechanism, a supplemental frame, P, adjustable on the main frame in line with the direction of length thereof, the stalk-carrier and top-cutter supported in said supplemental frame, and operating mechanism, substantially as set forth.

3. The combination, with the main frame, adjustable supplemental frame, and the apron-rollers journaled thereto, one of said rollers being formed hollow and provided with a key-way, of the shaft for driving said apron journaled in the main frame, and extended into the hollow roller, and having a key fitting the way thereof, and mechanism for driving said shaft, substantially as set forth.

4. The combination of the frame A, having rails M' fixed longitudinally on it, cutters E at the forward end of the frame, guides K K', extending along the frame A, a supplemental frame, P, fitted to slide on the said rails, rollers L' L², journaled in the supplemental frame, an apron, L, mounted on the rollers, and means for revolving the cane, substantially as shown and described.

5. The combination of the frame A, having rails M', the cutters E, mounted thereon, the frame P, fitted to slide on frame A, the rollers L' L², the apron L, and the saw M, mounted on the said frame P, substantially as shown and described.

6. The combination of the frame A, provided with rails M', the frame P, mounted to slide thereon, the rollers L' L², the apron L and saw M, mounted on the said frame P, and the receptacle M², secured to the frame A beneath the path of the saw M, substantially as shown and described.

7. The combination of the frame A, the cutters E, the frame P, the rollers L' L², and belt L, mounted on frame P, and the receptacle Q, substantially as shown and described.

8. The combination of the frame A, the receptacle Q, the trap door Q' therefor, the lever Q³, connected with the door Q', the receptacle M², the trap-door M³ therefor, and the rod M⁴, connecting the said two trap-doors, substantially as shown and described.

9. The combination of the frame A, provided with rails M', the frame P, mounted thereon, the forked lever R, having the legs R² and R³, the wheels and axles S, mounted on said legs, the drive-wheel S', and the cords S³ and S⁴, connecting the said frame P with the axles of wheels S, substantially as shown and described.

10. The combination of the frame A, provided with rails M' and A², the frame P, fitted to slide on the rails M', the rod T', fitted to slide on the rail A², and connected with frame P by a loose link, P², and means connecting with the rod T' to reciprocate the frame, substantially as shown and described.

11. The combination of the frame A, provided with the rails M', the frame P, mounted thereon, the rollers L' and L², journaled in the frame P, the apron L, mounted on the said rollers, the roller L' being hollow and internally longitudinally grooved, and a shaft, C', journaled in the frame A, passing through the roller L', and provided with a stud, D², engaging the said groove therein, substantially as shown and described.

12. The combination of the frame A, the frame P, mounted to slide thereon, the rollers L' and L², journaled in the frame P, the apron L, the saw M, journaled in the frame P, the shaft C', passing through the roller L', the quill D³, extending from the roller L' around the shaft C', and provided with a spur-wheel, D⁴, and a train of gear-wheels, D⁵ D⁶ D⁷ D⁸, connecting the wheel D⁴ with the said saw M, substantially as shown and described.

13. The combination of the frame A, provided with rails M', the saws E, the frame P, mounted on the said rails, the rollers L' and L², and apron L, mounted on the frame P, the shaft C', passing through the roller L', and provided with a pulley, a', the pulley a², mounted on a stud fixed in the frame A, and the chain-belt a, mounted on the pulleys a' and a², substantially as shown and described.

14. The combination of the frame P, the rollers L' and L², and the apron L, mounted thereon, the pulley b⁵, journaled on the frame P, the pulley b⁴, fixed on the shaft of the roller L², the chain b, provided with teeth b², and mounted on the pulleys b⁴ and b⁵, and the saw M, journaled in frame P, substantially as shown and described.

15. The combination of the frame P, the rollers L' and L², the apron L, the chain b, provided with teeth b² projecting from its outer face, and the studs b' projecting from one edge, the rail b³, fixed beneath the path of the said studs, and the clamp c, attached to the rail b³, substantially as shown and described.

16. The combination of the rail b³, the bow c³, the shoe c, fitted to slide vertically thereon to rest on the rail and turned up from the rail at one end, said shoe being pressed normally against the rail, the chain b, provided with teeth b², and the studs b', adapted to slide on the rail, substantially as shown and described.

17. The combination of the rail b³, the shoe c, fitted to press thereon, and the chain b, having studs b' projecting from one edge over the rail, and having teeth b² projecting from its outer face near its other edge, substantially as shown and described.

18. In a cane-harvester, the combination, with a carrier for the canes, of a belt and strippers supported thereon and formed of blades arranged to embrace a cane, means for drawing the blades toward each other to grasp the stalks and apart, and operating mechanism, substantially as described.

19. The combination of the frame A, having rails M', the frame P, mounted thereon and shorter than the rails, the belt L, mounted to revolve in frame P, the receptacle Q, the belt N, provided with blades and mounted on rollers N² and N³, slanted toward the said receptacle, substantially as shown and described.

20. The combination of the belt N, the rollers N² and N³, the shaft C', the roller L', provided with the quill D³ and the spur-wheel D⁴, and the sleeve d², geared at one end to the roller N² and connected by gearing at the other end with the spur-wheel D⁴, substantially as shown and described.

21. The combination of the belt N, the cutter-head e, secured thereto, the blades e', secured at one end to the said head, joined at the other end like a picket and semicircularly curved midway, and blades opposing said blades at the curve, substantially as shown and described.

22. The combination of the belt N, the cutter-head e, the blades e', secured thereto, the puppet f, passing through the belt, the blades N', provided with shanks pivoted to the said puppet, and a shoe, f', secured at its forward end to the under side of the belt and connected at its rear end with the puppet, substantially as shown and described.

23. The combination of the belt N, the blades e', secured thereto and provided with shoulders f², the puppet f, passing through the belt, and the blades N', provided with shanks 1, pivoted at their lower ends to the said puppet and adapted to pry against the said shoulders at points between their pivots and blades, substantially as shown and described.

The above specification of my invention signed by me in the presence of two subscribing witnesses.

SAMUEL H. PEARCY.

Witnesses:
W. X. STEVENS,
CHAS. A. PETTIT.